(12) United States Patent
Laurer et al.

(10) Patent No.: US 9,073,396 B2
(45) Date of Patent: Jul. 7, 2015

(54) ANTI-RATTLE DEVICE FOR RECEIVER HITCHES AND ACCESSORIES (71) Applicant: Cequent Performance Products, Inc., Plymouth, MI (US)

(72) Inventors: Austin J. Laurer, Canton, MI (US); Jacob S. Belinky, Carleton, MI (US); Gail R. Matheus, Salem, MI (US); David W. Hesch, Commerce, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 13/888,155

(22) Filed: May 6, 2013

(65) Prior Publication Data

US 2014/0327228 A1    Nov. 6, 2014

(51) Int. Cl.
*B60D 1/24* (2006.01)
*B60D 1/60* (2006.01)

(52) U.S. Cl.
CPC . *B60D 1/241* (2013.01); *B60D 1/60* (2013.01)

(58) Field of Classification Search
CPC ............. B60D 1/241; B60D 1/52; B60D 1/60
USPC ...................... 280/506, 507, 491.5
See application file for complete search history.

(56) References Cited

U.S. PATENT DOCUMENTS

| | | | |
|---|---|---|---|
| 5,423,566 A | 6/1995 | Warrington et al. | |
| 5,593,172 A | 1/1997 | Breslin | |
| 5,735,539 A | 4/1998 | Kravitz | |
| 5,879,102 A | 3/1999 | Koliopoulos | |
| 5,988,667 A | 11/1999 | Young | |
| 6,010,049 A | 1/2000 | Stein | |
| 6,010,143 A | 1/2000 | Stein | |
| 6,010,144 A | 1/2000 | Breslin | |
| 6,105,989 A | 8/2000 | Linger | |
| 6,334,561 B1 * | 1/2002 | Cole | 224/521 |
| 6,543,260 B2 | 4/2003 | Koy et al. | |
| 6,773,200 B2 * | 8/2004 | Cole | 403/378 |
| 6,945,550 B2 * | 9/2005 | Williams | 280/506 |
| 7,338,065 B1 * | 3/2008 | Clausen | 280/507 |
| 7,600,774 B1 * | 10/2009 | Speer et al. | 280/506 |
| 7,806,425 B2 * | 10/2010 | Chang | 280/507 |
| 8,079,613 B2 * | 12/2011 | Williams | 280/515 |
| 8,596,664 B2 * | 12/2013 | Lahn | 280/506 |
| 2002/0145270 A1 * | 10/2002 | Williams | 280/506 |
| 2004/0104558 A1 * | 6/2004 | Williams | 280/506 |
| 2005/0236811 A1 * | 10/2005 | Williams | 280/507 |

* cited by examiner

Primary Examiner — Kevin Hurley
(74) Attorney, Agent, or Firm — McDonald Hopkins LLC; Jeff Urian (57) ABSTRACT

An anti-rattle device is shown and described. The anti-rattle device may include a pin member configured for insertion into aligned apertures of a draw bar and receiver hitch, and a block member configured to be inserted into an interior cavity of the draw bar and to receive the pin member. The anti-rattle device may also include an engaging member engaged with the pin member outside of the draw bar and receiver hitch, where the engagement of the engaging member, the pin member and the block are operable to clamp the draw bar against the receiver hitch.

28 Claims, 7 Drawing Sheets

ANTI-RATTLE DEVICE FOR RECEIVER HITCHES AND ACCESSORIES

TECHNICAL FIELD

The present invention relates generally to an anti-rattle device for a receiver hitch, and more particularly, to an anti-rattle device operatively engaging a receiver hitch with a draw bar and reducing rattle therebetween.

BACKGROUND

Many vehicles are equipped with rear mounted receiver trailer hitches used for towing and as an attachment point for many other cargo accessories. These types of trailer hitches typically include a receiver opening or cavity used for the receipt of a draw bar. The receiver opening comes in various sizes depending upon the towing capabilities thereof. For example, receiver-type trailer hitch assemblies are typically offered with a square receiver opening of 1.25 inches (32 mm) for Class I/II, 2 inches (51 mm) for Class III/IV/V, and some Class V hitches are available in 2.5 inches (64 mm) opening sizes.

A draw bar having a shank includes outer dimensions slightly smaller than the internal dimensions of the receiver opening and is normally slidable within the receiver opening. The draw bar is typically connected to the receiver opening by a pin inserted through the two tubular portions thereof and locked or clipped to prevent removal of the draw bar from the trailer hitch. The two components are both toleranced to ensure that the draw bar can be freely inserted and removed from the receiver opening.

The draw bar may include a standard ball-mount for engaging with the coupler of a towed vehicle or other wheeled vehicle. Another popular use for receiver trailer hitches is the use as a coupling device for installing cargo accessory such as equipment racks onto the vehicle. Bicycle carrier racks, ski carriers, storage boxes and other types of carriers have been designed to use the above-described draw bar to engage within a receiver opening. This provides a universal system that allows a vehicle user to use various towed vehicles and accessory carriers with a single coupling system.

A particular problem with the use of these receiver hitch assemblies is the clearance between the internal dimensions of the receiver opening and the external dimensions of the draw bar. The tubular portions thereof by necessity must have sufficient clearance to be able to be easily telescoped together. However, this clearance between the two tubular portions allows relative movement between them. The draw bar tends to rattle or chatter within the receiver opening during use. This rattle or chatter can be a distraction to the driver and can cause premature wear to the components.

A need is therefore identified for an improved apparatus whereby the movement between the receiver opening and the draw bar is minimized. Further, there is a need for an anti-rattle apparatus that is easy to operate and is effective.

SUMMARY

An anti-rattle device is shown and described. The anti-rattle device may include a pin member configured for insertion into aligned apertures of a draw bar and receiver hitch, and a block member configured to be inserted into an interior cavity of the draw bar and to receive the pin member. The anti-rattle device may also include an engaging member engaged with the pin member outside of the draw bar and receiver hitch, where the engagement of the engaging member, the pin member and the block are operable to clamp the draw bar against the receiver hitch.

A system may include a receiver hitch configured to be attached with a vehicle, and a draw bar telescopingly engaged with the receiver hitch, the draw bar having an interior cavity. The system may also include an anti-rattle device engaged with the draw bar. The anti-rattle device may include a pin member inserted into and through the receiver and draw bar, a block member inserted into the interior cavity of the draw bar, the pin member engaged with the block member, and an engaging member selectively engaged with the pin member outside of the receiver and draw bar, where the engagement of the engaging member, the pin member and block member are operable to clamp the draw bar against the receiver hitch.

An accessory mounting assembly configured to be selectively secured with a receiver hitch may include a draw bar having an interior cavity and opposed apertures, the draw bar configured to telescopingly engage the receiver hitch. The accessory mounting assembly may also include an anti-rattle device selectively engageable with the draw bar. The anti-rattle device may include a pin member, the pin member selectively insertable into and through the opposed apertures of the draw bar, a block member, the block member having a block member aperture extending therethrough, the block member configured to be located within the interior cavity of the draw bar with the block member aperture aligned with at least one of the apertures of the draw bar, and an engaging member selectively engageable with the pin member exterior of the draw bar, engagement of the pin with the engaging member clamping the draw bar to the receiver hitch.

BRIEF DESCRIPTION OF THE DRAWINGS

Operation of the invention may be better understood by reference to the detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
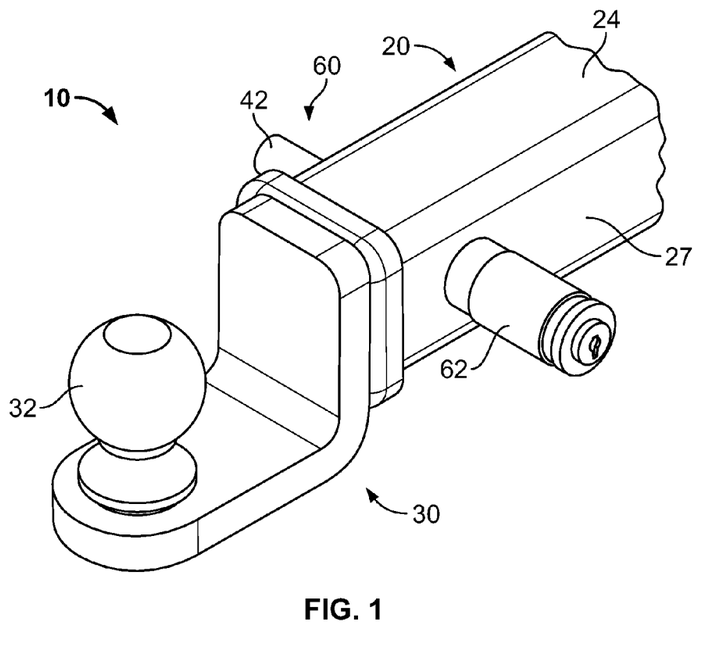
FIG. 1 is a perspective view of an embodiment of an anti-rattle device operatively engaging a receiver hitch with a draw bar.
Figure 2:
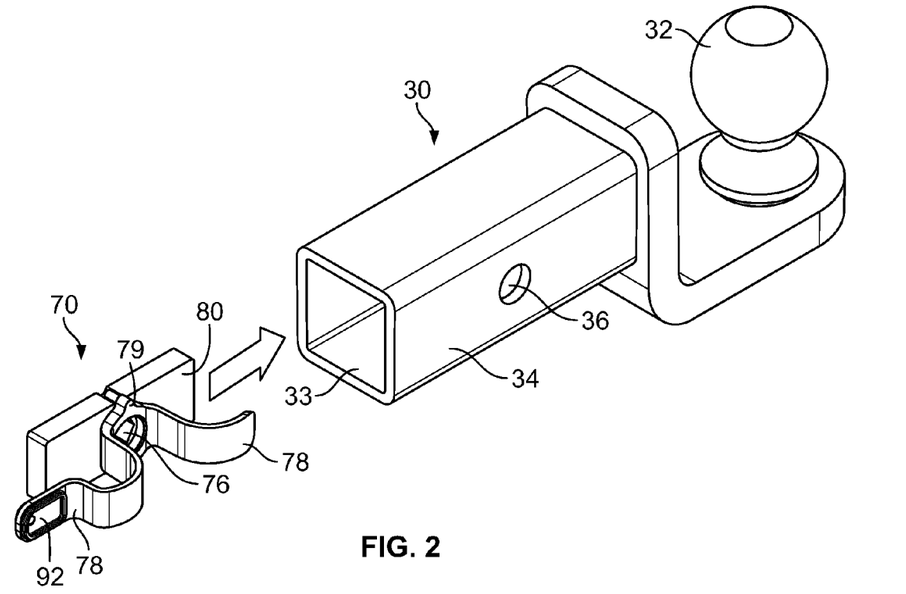
FIG. 2 is a perspective view of a draw bar and a portion of the anti-rattle device.
Figure 9:
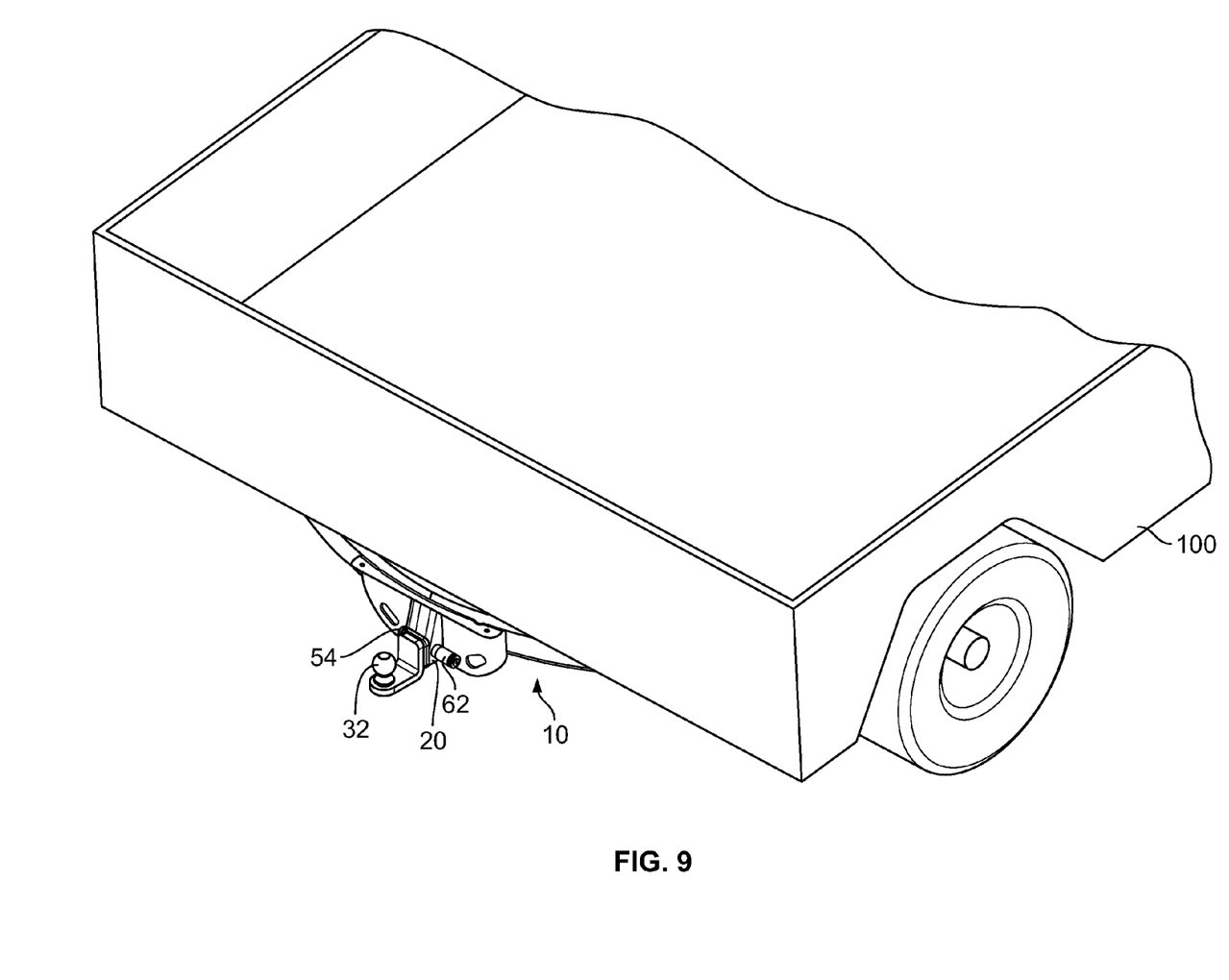
FIG. 9 is a perspective view of the anti-rattle device connected to a vehicle.
Figure 10:
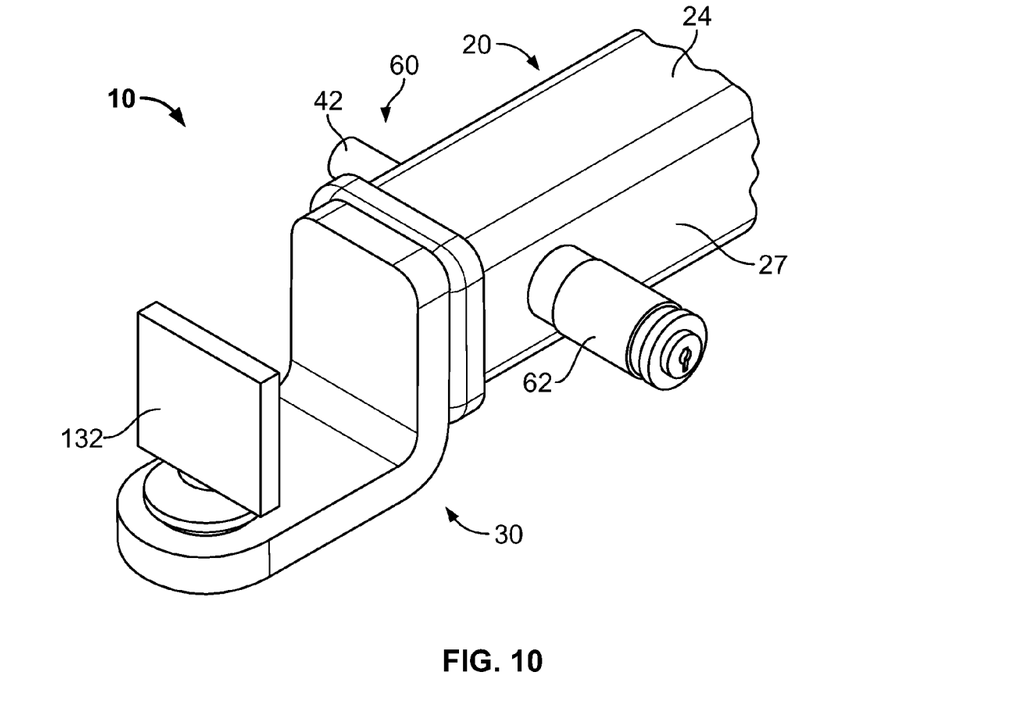
FIG. 10 is a perspective view of an embodiment of an anti-rattle device operatively engaging a receiver hitch with a draw bar having at least one of a bike rack, an accessory member, a cargo tray, a ski rack, a cargo platform, an accessory carrier, or a pintle mount identified as item 132.

Reference is now made to FIG. 1 illustrating exemplary embodiments of a receiver hitch 10. The receiver hitch 10 may be of any appropriate configuration. The present teachings are not limited to the receiver hitch 10 shown and described herein—any current or newly developed receiver hitch may be utilized. The receiver hitch 10 may be attached to a frame of a towing vehicle 100 as shown in FIG. 9 such as through use of fasteners or the like. As illustrated the receiver hitch 10 may include a receiver tube 20 adapted to selectively accept a draw bar of an appropriate shape and size as described in more detail below.

The receiver tube 20 may be mounted to the receiver hitch 10 by any appropriate mounting techniques, such as by fastening or welding. In some embodiments, the receiver tube 20 may include a square receiver opening 21 of approximately 1.25 inches (32 mm) for Class FR 2 inches (51 mm) for Class III/IV/V, or 2.5 inches (64 mm) for class V. It is to be expressly understood that other sizes or shapes of the receiver tube 20 and receiver opening 21 may be used without departing from the present teachings.

The receiver tube 20 may include an interior portion 22 and an exterior portion 24. The receiver tube 20 may also include at least two apertures 26 disposed from one another. By way of a non-limiting example, the apertures 26 may be generally aligned—such as axially aligned—on opposing sides 27 of the receiver tube 20. The apertures 26 may extend entirely through the sides 27 and may be configured to receive a pin as described in more detail below.

Figure 3:
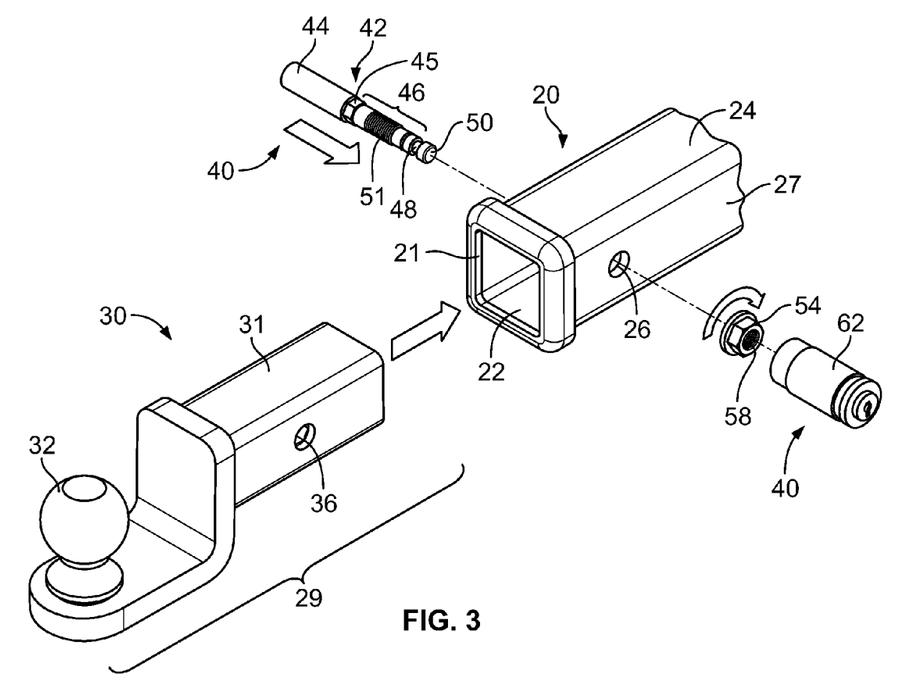
FIG. 3 is an exploded view of the anti-rattle device, the receiver hitch and the draw bar.
Figure 4:
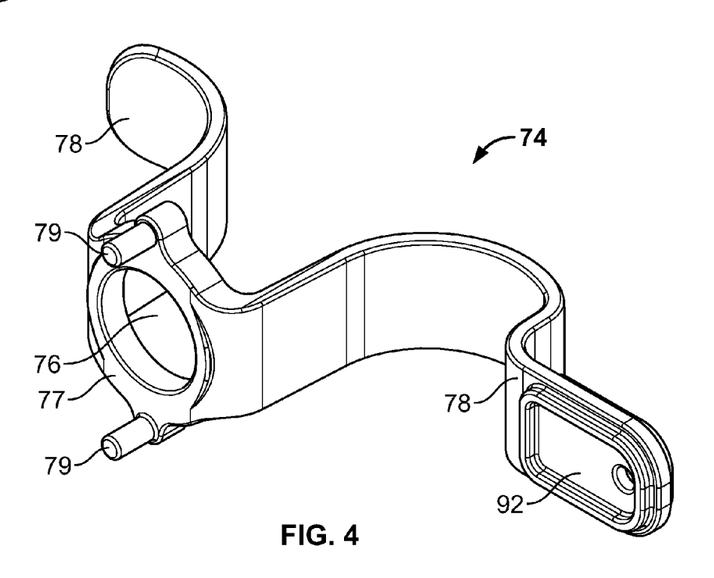
FIG. 4 is a perspective view of an embodiment of an alignment tool of the anti-rattle device.
Figure 6:
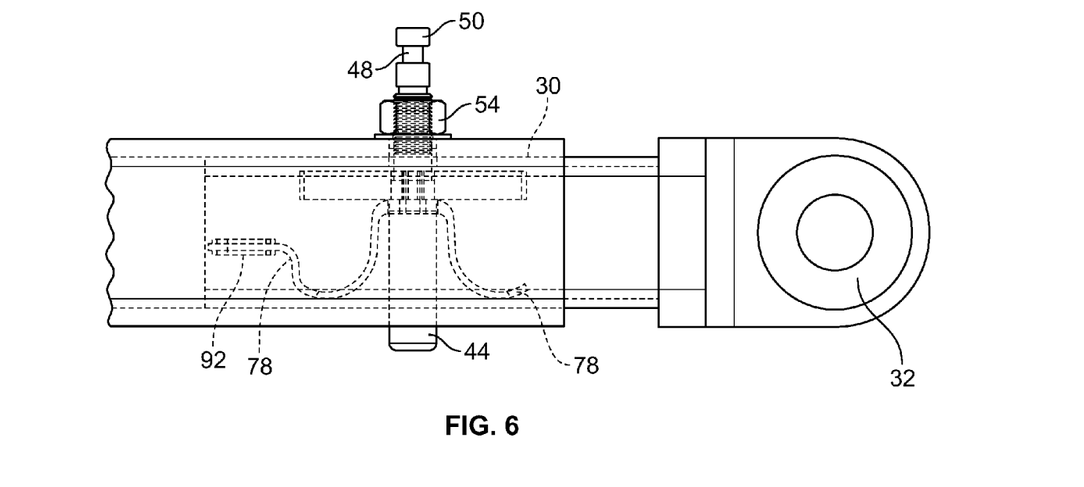
FIG. 6 is a partially phantomed top view of the anti-rattle device operatively engaged with the receiver hitch and the draw bar.

As shown in FIGS. 1, 3 and 6, a draw bar 30 may be selectively engaged with the receiver tube 20. The draw bar 30 may be of any appropriate configuration. The present teachings are not limited to the configuration shown and described. The draw bar 30 may include an external portion 31 having a generally corresponding shape to that of the interior portion 22 of the receiver tube 20. The draw bar 30 may also have an external diameter slightly less than the internal diameter of the receiver tube 20. This may enable the draw bar 30 to be inserted within the receiver tube 20 in a telescoping manner, as shown in FIG. 3. By way of a non-limiting example, the difference in the dimensions of the interior portion 22 of the receiver tube 20 and the exterior portion 31 of the draw bar 30 may be about one-sixteenth of an inch. This dimensional difference may allow the draw bar 30 to be easily inserted or telescoped within the receiver tube 20.

As shown, the draw bar 30 may include a trailer hitch ball 32 mounted thereon in any appropriate manner; including, by way of a non-limiting example, via fasteners or welding. It is to be expressly understood, however, that the present teachings are not limited to utilizing the draw bar 30 shown and described. In some embodiments, the draw bar 30 may be attached to any appropriately configured cargo accessory, such as bicycle carriers, ski carriers, cargo compartments, platforms and other types of receiver hitch-mounted devices.

As depicted in FIG. 3, draw bar 30 may include a generally hollow interior cavity 33 and include opposing side portions 34. Each of the side portions 34 of the draw bar 30 may include apertures 36 generally aligned with one another. The apertures 36 may be configured to receive a retaining pin as described in more detail below. By way of a non-limiting example, the apertures 36 may generally align with the apertures 26 of the receiver tube 20 when the draw bar 30 is operatively inserted or telescoped into the receiver tube 20.

An anti-rattle device 40 may be operatively and selectively attached with the receiver hitch 10 as shown in FIG. 1. The anti-rattle device 40 may include pin 42, shown in FIGS. 3 and 5. Pin 42 may include a head portion 44, an acircular engagement portion 45, an elongated body 46, a locking groove 48 and an end 50, which may be tapered. Elongated body 46 may include a threaded section 51. The threaded section 51 of the elongated body 46 may be spaced a distance d from head portion 44; see FIG. 5. This distance d may be equal to or less than the distance between the sides 27 of the receiver tube 20; see FIG. 6.

Figure 5:
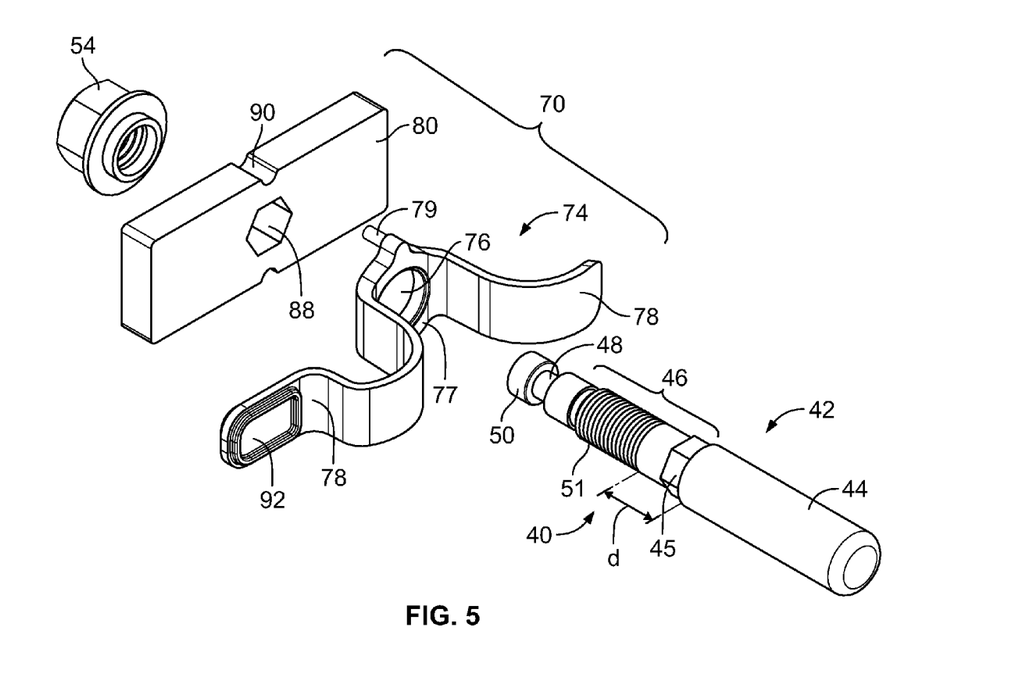
FIG. 5 is an exploded view of the anti-rattle device.

The head portion 44 may be of any appropriate shape and size. By way of a non-limiting example, the head portion 44 may be of a shape to make gripping of such easier for an operator. The head portion 44 may be of a wing shape, handle shape, hex head, square head, Allen head, star shape, circular shape or any other shape or configuration—the present teachings are not limited to a specific configuration.

As shown in FIGS. 3 and 5, the anti-rattle device 40 may include an engaging device 54 configured to selectively and operatively engage with the pin 42. By way of a non-limiting example, the engaging device 54 may be a nut as shown in the drawings. The engaging device 54 may have an internal threaded portion 58, i.e., a female threaded portion, configured to selectively, matingly engage with the threaded section 51 of pin 42.

Further, the anti-rattle device 40 may include a lock 62. Lock 62 may be configured to engage over the end 50 of pin 42 and engage onto locking groove 48 operatively securing the lock 62 with the pin 42. The lock 62 may be of any appropriate configuration. By way of a non-limiting example, the lock 62 may be of a configuration as shown and described in U.S. Pat. No. 6,543,260, which is incorporated herein by reference.

The anti-rattle device 40 may further include a block-alignment assembly 70. As shown in FIG. 5, the block-alignment assembly 70 may include an alignment tool 74, which may be generally U-shaped with an aperture 76 in generally proximity to a central portion 77 of the "U." Further, while the aperture 76 is shown and described, the present teachings are not limited to such. The alignment tool 74 may include a slot, cut-out, or the like configured such that the pin 42 may pass therethrough. The alignment tool 74 may further include a pair of arms 78 extending from the central portion 77—although any number of arms may be used. It should be understood, however, that the alignment tool 74 is not limited to this configuration. Any appropriate configuration may be used without departing from the present teachings. The alignment tool 74 may be formed from plastic, metal, or any other suitable material.

The arms 78 of the alignment tool 74 may be of a shape and size such that the alignment tool 74 is of a size that is slightly larger than the internal dimension of the interior cavity 33 of the draw bar 30. The arms 78 may be resilient such that they may be compressed or otherwise resiliently positioned such that the alignment tool 74 may be inserted within the draw bar 30. The arms 78 may be resilient such that they may bias against the interior cavity 33 of the draw bar 30 when inserted therein. This biasing may generally keep the alignment tool 74 in a desired position within the interior cavity 33 of the draw bar 30.

The alignment tool 74 may also include at least one tab 79 extending therefrom—as shown the tab 79 may extend from the central portion 77 of the alignment tool 74. The tab 79 may be configured to engage with a block 80 of the block-alignment assembly 70. The block 80 may be generally rectangular in shape, and of an external diameter slightly less than an internal dimension of the interior cavity 33 of the draw bar 30. This may enable the block 80 to be inserted within the draw bar 30. Block 80 may be sized and shaped to limit rotation of block 80 within interior cavity 33. The block 80 may be comprised of steel, plastic or any other suitable metal or non-metal material.

The block 80 may include at least one aperture 88 configured to receive the pin 42. The aperture 88 may be of any appropriate shape and size to receive the pin 42. The aperture 88 may be of a shape that is matingly corresponding to the shape of the engagement portion 45 of the pin 42. By way of a non-limiting example, the aperture 88 may be a generally acircular shape corresponding to that of the acircular shape of the engagement portion 45. As shown in FIG. 5, the aperture 88 may be of a generally hexagonal shape and the engagement portion 45 may be of a generally hexagonal shape—although the present teachings are not limited to this shape. Engagement of engagement portion 45 with aperture 88 may limit and/or prevent relative rotation between pin 42 and block 80. Further, while the aperture 88 is shown and described, the present teachings are not limited to such. The block 80 may include a slot, cut-out, or the like configured such that the pin 42 may pass therethrough.

The block 80 may include at least one notch or slot 90 configured to receive the at least one tab 79 of the alignment tool 74. The notch 90 may be of any appropriate configuration and size. In some embodiments, engagement of the notch 90 and tab 79 may be generally loose. This may make it easier for the engagement of the block 80 with the alignment tool 74. The present teachings, however, are not limited to this configuration. In other embodiments, the alignment tool 74 may include a notch or slot while the block 80 includes the tab. Moreover, the present teachings are not limited to the notch and tab engagement. Any appropriate engaging mechanism or device may be used such that the alignment tool 74 is capable of engaging with the block 80.

In use, the alignment tool 74 may engage the block 80 through insertion of the at least one tab 79 of the alignment tool 74 into the notch 90 of the block 80. This may align the aperture 88 of the block 80 with the at least one aperture 76 of the alignment tool 74. The block-alignment assembly 70 may then be inserted into the interior cavity 33 of the draw bar 30, aligning the apertures 76 and 88 of the alignment tool 74 and block 80, with the apertures 36 of the draw bar 30.

The alignment tool 74 may include a grasping portion 92 positioned on at least one of the arms 78. The grasping portion 92 may assist the operator in grasping and manipulating the alignment tool 74 and in turn the block-alignment assembly 70. The grasping portion 92 may be of any appropriate configuration; the present teachings are not limited to the configuration shown. In such embodiments, the operator may grab the grasping portion 92 and use it to appropriately align the block-alignment assembly 70 within the interior cavity 33 of the draw bar 30, i.e., to generally align the apertures 36, 76 and 88 such that the pin 42 may be inserted therein. The arms 78 may be of a configuration such that when the alignment tool 74 is inserted into the interior cavity 33, the arms 78 may bias against the interior cavity 33 generally preventing unwanted movement of the block-alignment assembly 70 relative to the draw bar 30.

Draw bar 30 may be received within the receiver tube 20 until the apertures 76, 88, and 36 are generally aligned with the apertures 26 of the receiver tube 20. Pin 42 may be inserted into the apertures 26 with the threaded section 51 of the pin 42 extending outward of the draw bar 30 and receiver tube 20. The engagement portion 45 of the pin 42 may engage with the aperture 88 of the block 80. The shapes of the engagement portion 45 and the aperture 88 may correspond with one another. The engagement of the engagement portion 45 and aperture 88 may form a non-rotating engagement, i.e., the pin 42 may be generally limited and/or prevented from rotating relative to block 80, receiver tube 20 and draw bar 30.

Once engaged, the engaging device 54 may be engaged with pin 42 and rotated relative thereto to tighten the engaging device 54 against the exterior wall 24 of the receiver tube 20. As the engaging device 54 continues to be rotated relative to the pin 42, the engaging device 54 may exert pressure against the exterior portion 24 on the sidewall 27 of the receiver tube 20 while the pin 42 pushes on block 80 which thereby clamps against the exterior portion 31 of the draw bar 30 against the interior cavity 33 of the receiver tube 20. Engaging device 54 may be sufficiently tightened against the exterior portion 24 of the receiver tube 20 so that relative movement between the receiver tube 20 and the draw bar 30 is minimized or even eliminated. Eliminating the relative movement may generally eliminate the rattling that may otherwise be present.

Figure 7:
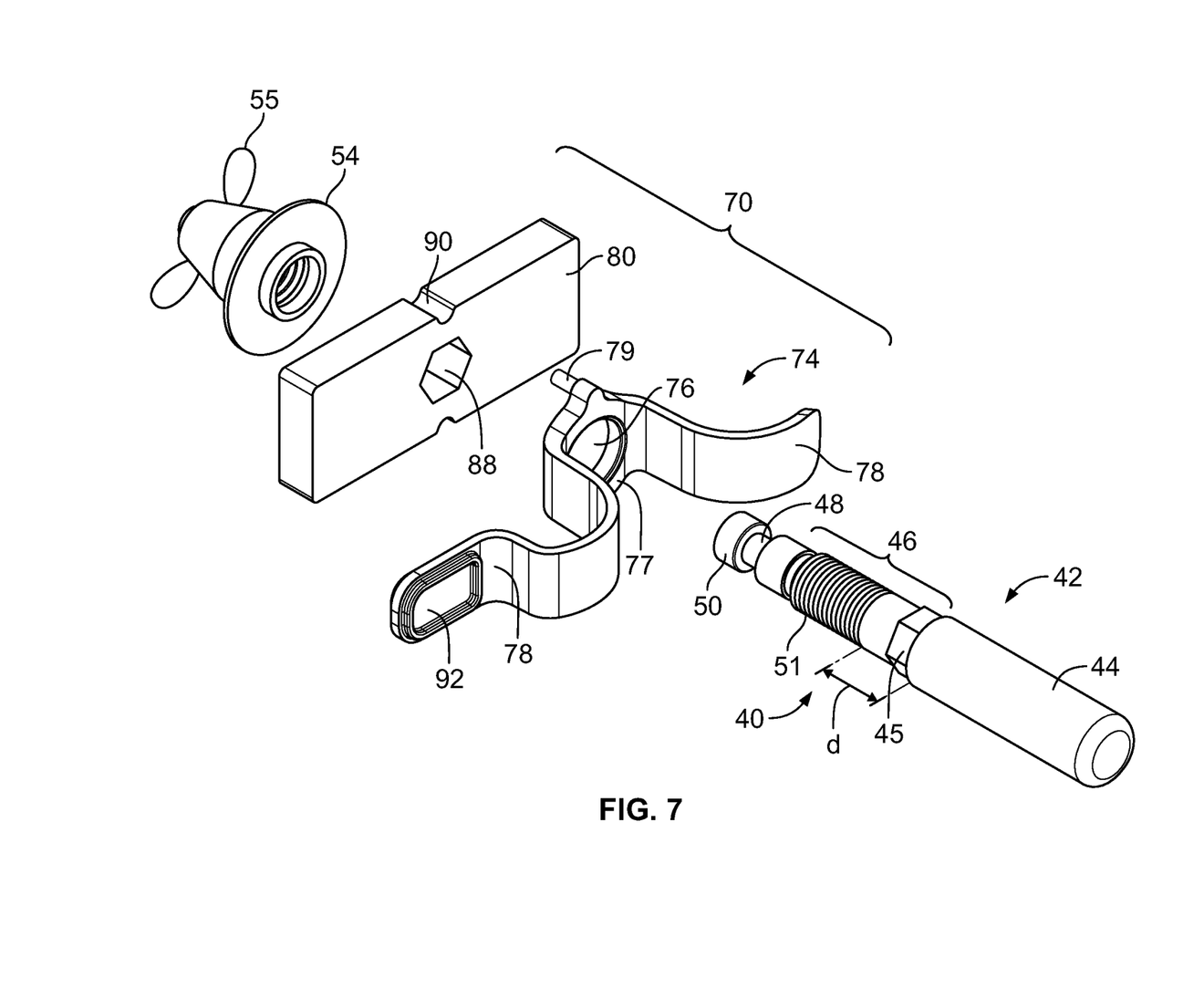
FIG. 7 is an exploded view of an anti-rattle device with an engagement device with a handle.

In some embodiments, and as shown in FIG. 7, a handle 55 or other grasping device may be included with the engaging device 54 to facilitate tightening of the engaging device 54. The handle 55 may be of any appropriate shape and size and is not limited to that shown and described. The handle 55 may include a bore (not shown) that may extend therethrough such that the end 50 of the pin may extend through and out of the handle 55. In some embodiments, the handle 55 may include wings. This may result in the engaging device 54 being a wing nut with wings extending therefrom to facilitate tightening of the engaging device 54.

In some embodiments, the lock 62 may be utilized to secure the pin 42 with the draw bar 30 and receiver tube 20. The lock 62 may prevent unauthorized removal of the anti-rattle device 40 and the draw bar 30. Pin 42 may include the locking groove 48 and the lock 62 may engage this locking groove 48 to retain the lock 62 to the pin 42 and prevent removal thereof.

In some embodiments, the lock 62 may not be utilized. Alternatively, or in addition to a pin clip (not shown) may be selectively and operatively engaged with the locking groove 48 to prevent the pin 42 from being removed. Other types of securing mechanisms may be used as well to prevent the removal of pin 42 from the draw bar 30 and receiver tube 20.

It is to be expressly understood that while the block-alignment assembly 70 is discussed in the exemplary embodiment for descriptive purposes, other resilient mechanism can be used as well to maintain the alignment between the engaging device 54 and the two apertures 26 of the receiver tube 20. For example, in another embodiment, engaging device 54 may be affixed either permanently or temporarily on the exterior portion 24 of the receiver tube 20 by welding, by adhesive or by other known mechanisms. In some embodiments, an alignment member (not shown), such as a detent member, notch, or other member may be incorporated in either the engaging device 54 or the draw bar 30 to align the engaging device 54 with the apertures 26, 36. In some embodiments, a cam lock or a clip could be used to maintain the alignment of the receiver hitch 10.

Additional embodiments of an anti-rattle device according to the present teachings are described below. In the descriptions, all of the details and components may not be fully described or shown. Rather, the features or components are described and, in some instances, differences with the above-described embodiments may be pointed out. Moreover, it should be appreciated that these other embodiments may include elements or components utilized in the above-described embodiments although not shown or described. Thus, the descriptions of these other embodiments are merely exemplary and not all-inclusive nor exclusive. Moreover, it should be appreciated that the features, components, elements and functionalities of the various embodiments may be combined or altered to achieve a desired anti-rattle device without departing from the spirit and scope of the present invention.

Figure 8:
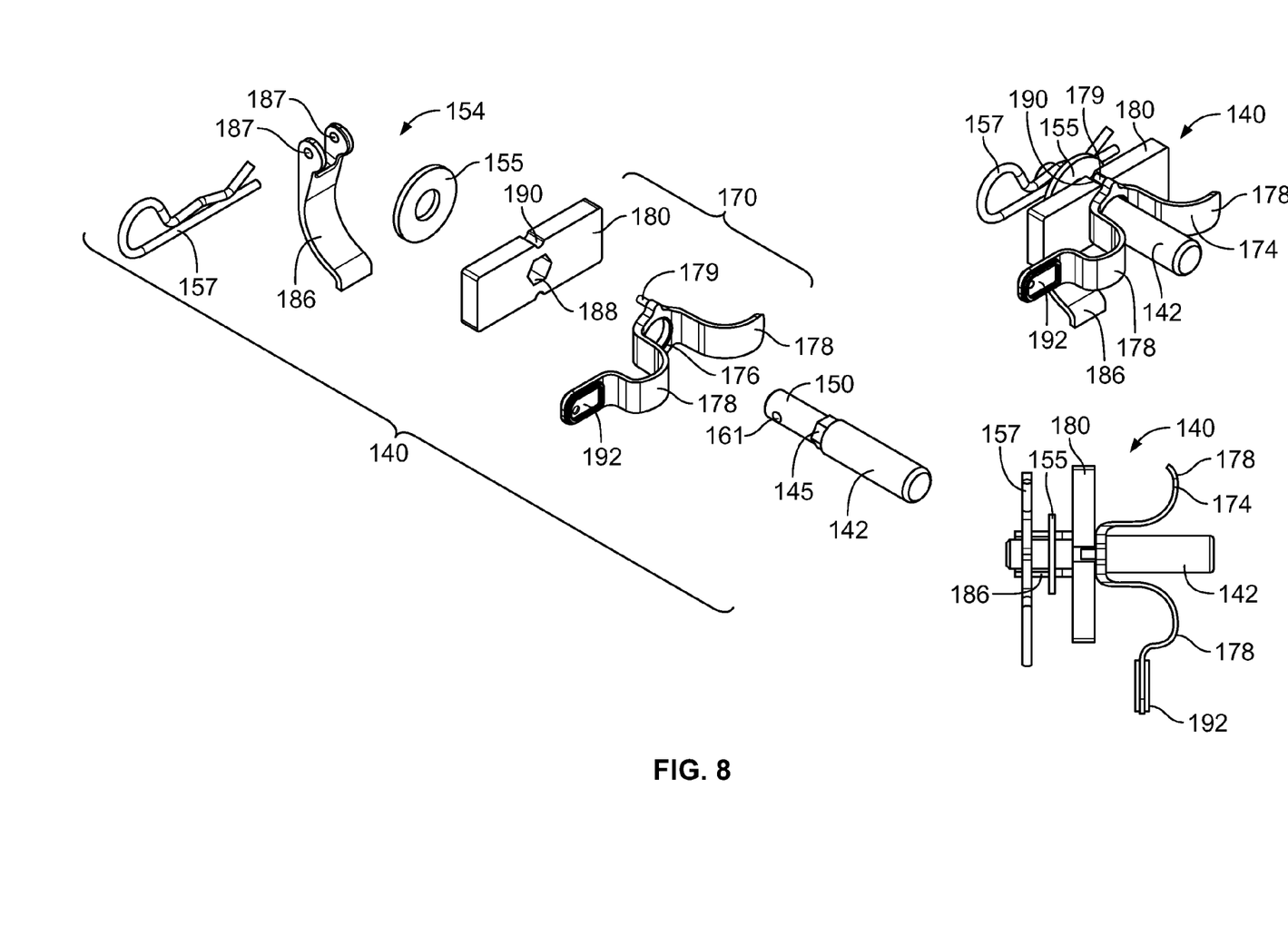
FIG. 8 is an exploded view, a perspective view, and top view of an anti-rattle device with an engagement device having a cam handle.

As shown in FIG. 8, an anti-rattle device 140 may include an engaging device 154 configured to selectively and operatively engage with pin 142. By way of a non-limiting example, the engaging device 154 may include a washer 155, a pin clip 157—such as cotter pin shown in FIG. 8, and a cam handle 186 pivotally securable with an end 150 of the pin 142. In some embodiments, the pin 142 may include an aperture 161. The aperture 161 may be positioned in proximity or at the end 150 of the pin 142. In such embodiments, once the draw bar 30 is inserted into the receiver opening 21, pin 142 may be inserted through and extend outward of the draw bar 30 and receiver tube 20. The pin 142, or more specifically, the end 150 of the pin 142, may be inserted through the washer 155. The cam handle 186 may include apertures 187 that may be generally aligned with the aperture 161 of the pin 142. The pin clip 157 may be inserted through apertures 186, 161, which may pivotally secure the cam handle 186 with the pin 142. With cam handle 186, including, the washer 155, in a desired position relative to pin 142, draw bar 30 may engage with receiver tube 20 generally preventing rattling therebetween.

The cam handle 186 may provide a mechanism for the operator to grasp during operation. The cam handle 186 and washer 155 may be positioned outside of the draw bar 30 and receiver tube 20. This may provide easy access for the operator to operate the cam handle 186. The operator is not required to attempt to access the engaging device 154 inside of either of the draw bar 30 or receiver tube 20.

In such embodiments, the anti-rattle device 140 may include a block-alignment assembly 170 that may include an alignment tool 174, which may be generally U-shaped with an aperture 176 in generally proximity to a central portion 177 of the "U." The alignment tool 174 may further include a pair of arms 178 extending from the central portion 177. The arms 178 of the alignment tool 174 may be of a shape and size that the alignment tool 174 is of a size that is slightly larger than the internal dimension of the interior cavity 33 of the draw bar 30. The arms 178 may be resilient such that they may be compressed or otherwise resiliently positioned such that the alignment tool 174 may be inserted within the draw bar 30. The arms 178 may be resilient and may bias against the interior cavity 33 of the draw bar 30 when inserted therein. This biasing may generally keep the alignment tool 174 in a desired position within the interior cavity 33 of the draw bar 30. The alignment tool 174 may also include a grasping portion 192 positioned on at least one of the arms 178. The grasping portion 192 may assist the operator in grasping and manipulating the alignment tool 174 and in turn the block-alignment assembly 170.

The alignment tool 174 may further include at least one tab 179 extending therefrom—as shown the tab 179 may extend from the central portion 177 of the alignment tool 174. The tab 179 may be configured to engage with a block 180 of the block-alignment assembly 170. The block 180 may be generally rectangular in shape, and of an external diameter slightly less than an internal dimension of the interior cavity 33 of the draw bar 30. This may enable the block 180 to be inserted within the draw bar 30. Block 180 may be sized and shaped to limit rotation of block 180 within interior cavity 33. The block 180 may be comprised of steel, plastic or any other suitable metal or non-metal material.

The block 180 may include at least one aperture 188 configured to receive the pin 142. The aperture 188 may be of any appropriate shape and size to receive the pin 142. The aperture 188 may be of a shape that is matingly corresponding to the shape of an engagement portion 145 of the pin 142. Engagement of engagement portion 145 with aperture 188 may limit and/or prevent relative rotation between pin 142 and block 180. The block 180 may include at least one notch or slot 190 configured to receive the at least one tab 179 of the alignment tool 174.

The foregoing description of the embodiments of the invention has been presented for purposes of illustration and description. It is not intended to be exhaustive or to limit the invention to the precise form disclosed. Obvious modifications or variations are possible in light of the above teachings. The embodiments were chosen and described to provide illustration of the principles of the present teachings and their practical application to thereby enable one of ordinary skill in the art to utilize the present teachings in various embodiments and with various modifications as are suited to the particular use contemplated. All such modifications and variations are within the scope of the invention as determined by the appended claims when interpreted in accordance with the breadth, to which they are fairly, legally and equitably entitled. The drawings and preferred embodiment do not and are not intended to limit the ordinary meaning of the claims and their fair and broad interpretation in any way.

What is claimed is:

1. An anti-rattle device comprising:
 a pin member configured for insertion into aligned apertures of a draw bar and receiver hitch;
 a block member configured to be inserted into an interior cavity of the draw bar and to engage the pin member;
 an engaging member engaged with the pin member outside of the draw bar and receiver hitch, wherein engagement of the engaging member, the pin member and the block member are operable to clamp the draw bar against the receiver hitch; and
 an alignment tool engaged with the block member, the alignment tool configured to be selectively inserted within and removed from the interior cavity of the draw bar, wherein the engaging member includes a cam handle movably engaged with the pin member and engageable with the receiver hitch.

2. The anti-rattle device of claim 1, wherein the alignment tool is configured to receive the pin member.

3. The anti-rattle device of claim 2, wherein the block member includes at least one of a notch or tab and the alignment tool includes at least one of a tab or notch, whereby the notch or tab of the alignment tool is configured to engage the tab or notch of the block member, respectively.

4. The anti-rattle device of claim 2, wherein the block member includes an aperture configured to receive the pin member.

5. The anti-rattle device of claim 4, wherein the alignment tool positions the aperture of the block member in general alignment with an aperture of the draw bar.

6. The anti-rattle device of claim 5, wherein the alignment tool includes an aperture configured to receive the pin member.

7. The anti-rattle device of claim 6, wherein the pin member includes an acircular portion and the aperture of the block member has an acircular shape, whereby engagement of the acircular portion with the acircular aperture generally prevents rotation of the pin member relative to the block member.

8. The anti-rattle device of claim 7, wherein the alignment tool includes a handle portion.

9. The anti-rattle device of claim 8, wherein the alignment tool is configured to bias against the interior cavity of the draw bar.

10. The anti-rattle device of claim 1, wherein the engaging member includes a nut having threads that are selectively engageable with threads of the pin member, whereby the nut is capable of engaging a side wall of the receiver hitch drawing the draw bar into secure engagement with the receiver hitch.

11. The anti-rattle device of claim 1, further comprising a lock engaged with the pin member, the lock preventing removal of the pin member.

12. A system comprising:
a receiver hitch configured to be attached with a vehicle;
a draw bar telescopingly engaged with the receiver hitch, the draw bar having an interior cavity;
an anti-rattle device engaged with the draw bar, the anti-rattle device comprising:
a pin member inserted through the receiver hitch and draw bar;
a block member inserted into the interior cavity of the draw bar, the pin member engaged with the block member;
an engaging member selectively engaged with the pin member outside of the receiver hitch and draw bar, wherein the engagement of the engaging member, the pin member and block member are operable to clamp the draw bar against the receiver hitch; and
an alignment tool engaged with the block member and inserted into the interior cavity, the alignment tool having an at least one arm.

13. The system of claim 12, wherein the alignment tool positions the block member into an operable position relative to the receiver hitch and draw bar.

14. The system of claim 13, wherein the block member includes a block member aperture, the draw bar includes opposed draw bar apertures, whereby the alignment tool positions the block member aperture in general alignment with at least one of the opposed draw bar apertures.

15. The system of claim 14, wherein the at least one arm biases against the draw bar upon insertion of the alignment tool within the interior cavity of the draw bar.

16. The system of claim 15, wherein the at least one arm generally prevents movement of the block member within the interior cavity of the draw bar.

17. The system of claim 12, wherein the engaging member includes a nut having threads that are selectively engageable with threads of the pin member, whereby the nut is capable of engaging a side wall of the receiver hitch drawing the draw bar into secure engagement with the receiver hitch.

18. An accessory mounting assembly configured to be selectively secured with a receiver hitch, the accessory mounting assembly comprising:
a draw bar having an interior cavity and opposed apertures, the draw bar configured to telescopingly engage the receiver hitch, the opposed apertures having diameters;
an anti-rattle device selectively engageable with the draw bar, the anti-rattle device comprising:
a pin member, the pin member selectively insertable into and through the opposed apertures of the draw bar, the pin member having a free end, the free end having a diameter that is less than the diameter of at least one of the opposed apertures of the draw bar;
a block member, the block member having a block member aperture extending therethrough, the block member configured to be located within the interior cavity of the draw bar with the block member aperture aligned with at least one of the apertures of the draw bar; and
an engaging member selectively engageable with the pin member exterior of the draw bar, engagement of the pin with the engaging member clamping the draw bar to the receiver hitch.

19. The accessory mounting device of claim 18, further comprising an alignment tool engaged with the block member, the alignment tool insertable into the interior cavity of the draw bar, wherein the alignment tool is configured to align the block member aperture with the at least one of the apertures of the draw bar.

20. The accessory mounting assembly of claim 19, wherein the alignment tool includes at least one arm, wherein the at least one arm engages with the interior cavity of the draw bar generally preventing movement of the block member.

21. The accessory mounting assembly of claim 18, wherein the draw bar includes a ball mount.

22. The accessory mounting assembly of claim 18, wherein the draw bar includes at least one of a bike rack, an accessory member, a cargo tray, a ski rack, a cargo platform, an accessory carrier, and a pintle mount.

23. The accessory mounting assembly of claim 18, wherein engagement of the engaging member with the pin member generally prevents rattling between the draw bar and receiver hitch.

24. The accessory mounting assembly of claim 18, wherein engagement of the engaging member with the pin member pulls the draw bar into engagement with the receiver hitch.

25. The accessory mounting assembly of claim 18, wherein the pin member includes an anti-rotation feature whereby the anti-rotation feature of the pin member engages the block member aperture to prevent rotation of the pin member relative to the block member.

26. The accessory mounting assembly of claim 25, wherein the anti-rotation feature includes an acircular shaped surface and the block member aperture has an acircular shape.

27. The accessory mounting assembly of claim 26, wherein the acircular shaped surface is generally hexagonal and the acircular shape is a corresponding hexagonal shape.

28. An anti-rattle device comprising:
a pin member configured for insertion into aligned apertures of a draw bar and receiver hitch;
a block member configured to be inserted into an interior cavity of the draw bar and to engage the pin member;
an engaging member engaged with the pin member outside of the draw bar and receiver hitch, wherein engagement of the engaging member, the pin member and the block member are operable to clamp the draw bar against the receiver hitch;
an alignment tool engaged with the block member, the alignment tool configured to be selectively inserted within and removed from the interior cavity of the draw bar; and
wherein the block member includes at least one of a notch or tab and the alignment tool includes at least one of a tab or notch, whereby the notch or tab of the alignment tool is configured to engage the tab or notch of the block member, respectively.

* * * * *